US012605012B1

(12) United States Patent
Becker

(10) Patent No.: US 12,605,012 B1
(45) Date of Patent: Apr. 21, 2026

(54) PAN AND SUSPENDED COOKING RACK

(71) Applicant: Aaron Becker, Polk City, IA (US)

(72) Inventor: Aaron Becker, Polk City, IA (US)

(*) Notice: Subject to any disclaimer, the term of this patent is extended or adjusted under 35 U.S.C. 154(b) by 0 days.

(21) Appl. No.: 19/270,020

(22) Filed: Jul. 15, 2025

(51) Int. Cl.
  *A47J 37/06* (2006.01)
  *A47J 37/07* (2006.01)

(52) U.S. Cl.
  CPC .... *A47J 37/0694* (2013.01); *A47J 2037/0795* (2013.01)

(58) Field of Classification Search
  CPC ................ A47J 37/0713; A47J 37/0694; A47J 2037/0795
  See application file for complete search history.

(56) References Cited

U.S. PATENT DOCUMENTS

| | | | |
|---|---|---|---|
| 4,559,869 | A | 12/1985 | Hogan |
| D386,939 | S | 12/1997 | Kelly et al. |
| 5,913,965 | A | 6/1999 | Gargano |
| 7,350,458 | B2 | 4/2008 | Leibowitz |
| 7,770,514 | B1 | 8/2010 | Bourgeois et al. |
| 8,627,764 | B1 | 1/2014 | Cloutier et al. |
| D741,650 | S | 10/2015 | Bombard et al. |
| 9,730,553 | B2 | 8/2017 | Bombard et al. |
| 11,284,747 | B2 | 3/2022 | Meyer |
| 2025/0194856 | A1* | 6/2025 | Kontoghiorghes ... A47J 37/041 |

FOREIGN PATENT DOCUMENTS

NZ          416285          8/2012

OTHER PUBLICATIONS

Skyflame Adjustable Griddle Warming Rack for 17" 22" 28" 36" Griddles, https://www.amazon.com/Skyflame-Adjustable-Accessories-Compatible-Blackstone/dp/B09XDL1VGL/ref=sxin_15_pa_sp_search_thematic_sspa?content-id=amzn1.sym.d5a4c576-1444-4de3-bd17-3c25a21a3780%3Aamzn1.sym.d5a4c576-1444-4de3-bd1 (Year: 2022).*
SHIZZO Rolling Grill Basket, https://www.amazon.com/dp/B0D87SH9ZB/ref=sspa_dk_detail_5?psc=1&pf_rd_p=7446a9d1-25fe-4460-b135-a60336bad2c9&pf_rd_r=S58QTQZ7JA0GMS14J9V5&pd_rd_wg=a48OM&pd_rd_w=ewlvT&content-id=amzn1.sym.7446a9d1-25fe-4460-b135-a60336bad2c9&pd_rd_r=4c299492-dc99-46b9-bc0a-63c247ef96a0&sp (Year: 2024).*
Hislaves, Hislaves Kitchen Tools for Home, Detachable Pot Lid Holder Rust-proof Floor Type Practical Pan Lid Cover Rack Cooking Tools Pot Lid Rack Cooking Tools, https://www.amazon.in/Hislaves-Kitchen-Detachable-Rust-proof-Practical/dp/B0C412L4MJ, 2 pages, Date:N/A.

* cited by examiner

*Primary Examiner* — Tiffany T Tran
(74) *Attorney, Agent, or Firm* — Goodhue, Coleman & Owens, P.C.

(57) ABSTRACT

A pan and suspended cooking rack system for baking, curing, and dehydrating meats, such as bacon, features a base tray with raised edges, two vertical supports, and a mesh rack with half-cylindrical tubes positioned horizontally and perpendicular to the supports. Meat drapes over the tubes curved surfaces for uniform heat exposure, with grease draining into the tray, eliminating reliance on a horizontal pan or rack. Supports are adjustable, and tube configurations are reconfigurable, with attachment options including hinged, snap-on, threaded, magnetic, friction-fit, clamp-on, and modular adapters for versatility. The system adapts to BBQ grills or smokers with connectors like hooks or clamps on the supports ends for grate attachment, enhancing outdoor use.

7 Claims, 5 Drawing Sheets

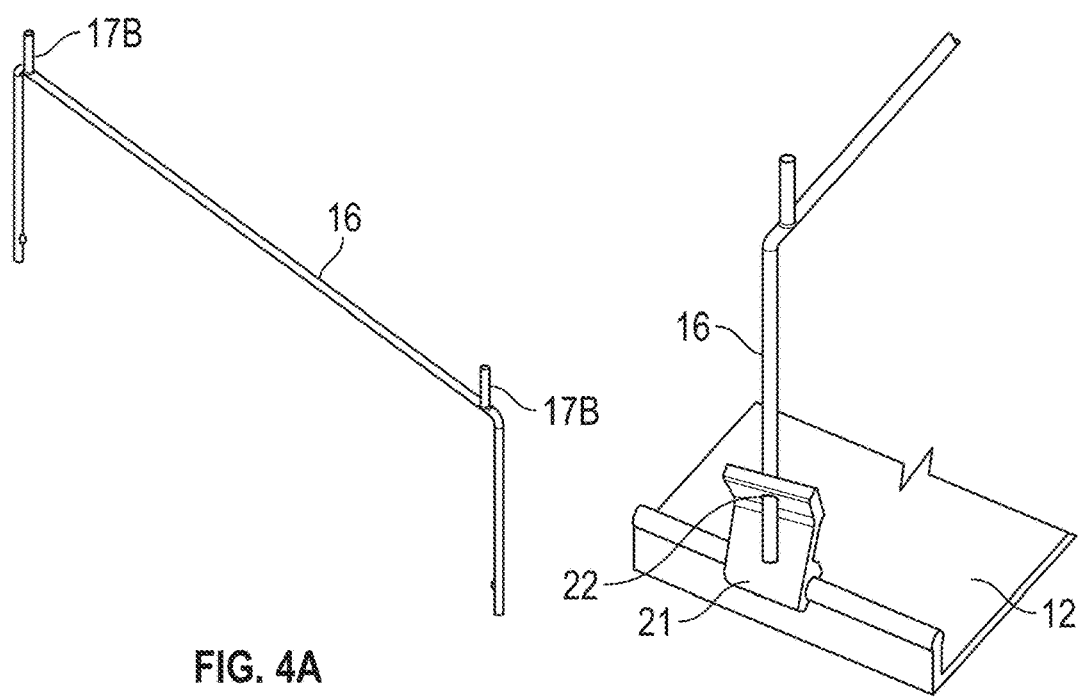
FIG. 4A
FIG. 4B
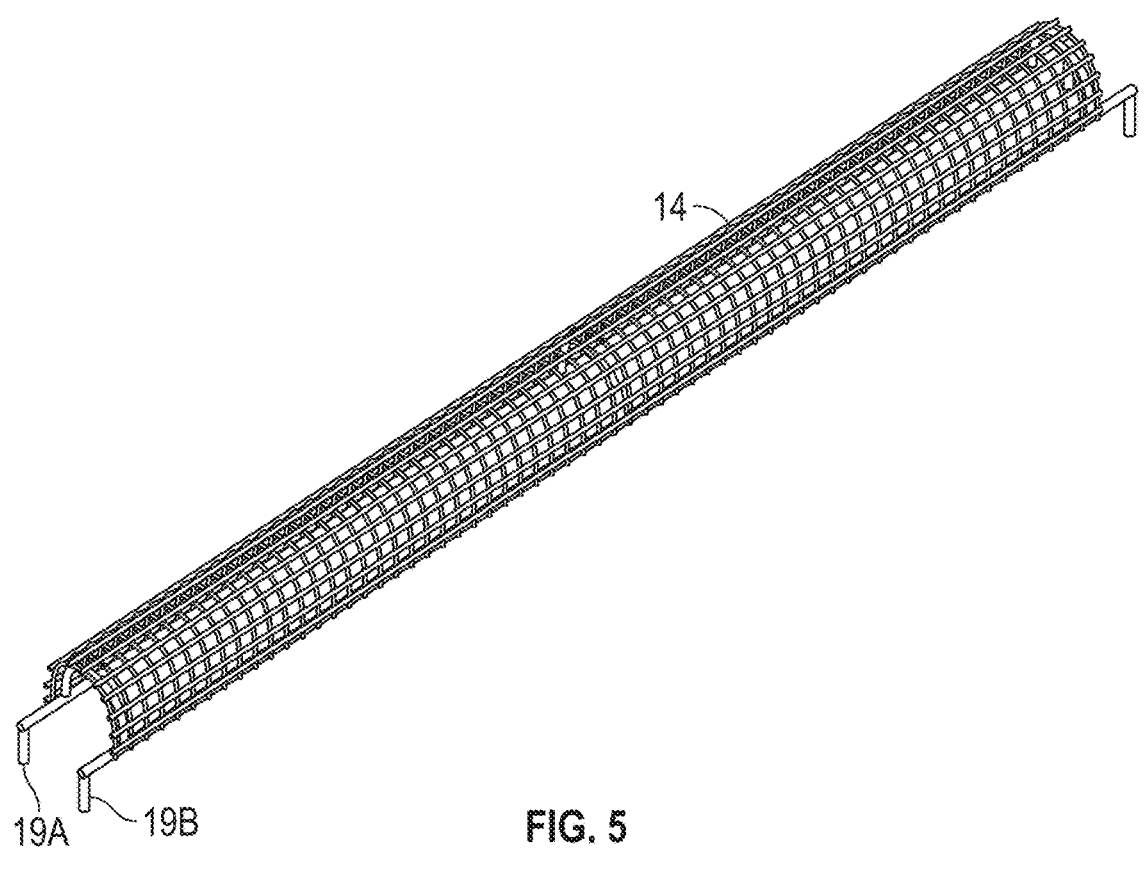
FIG. 5

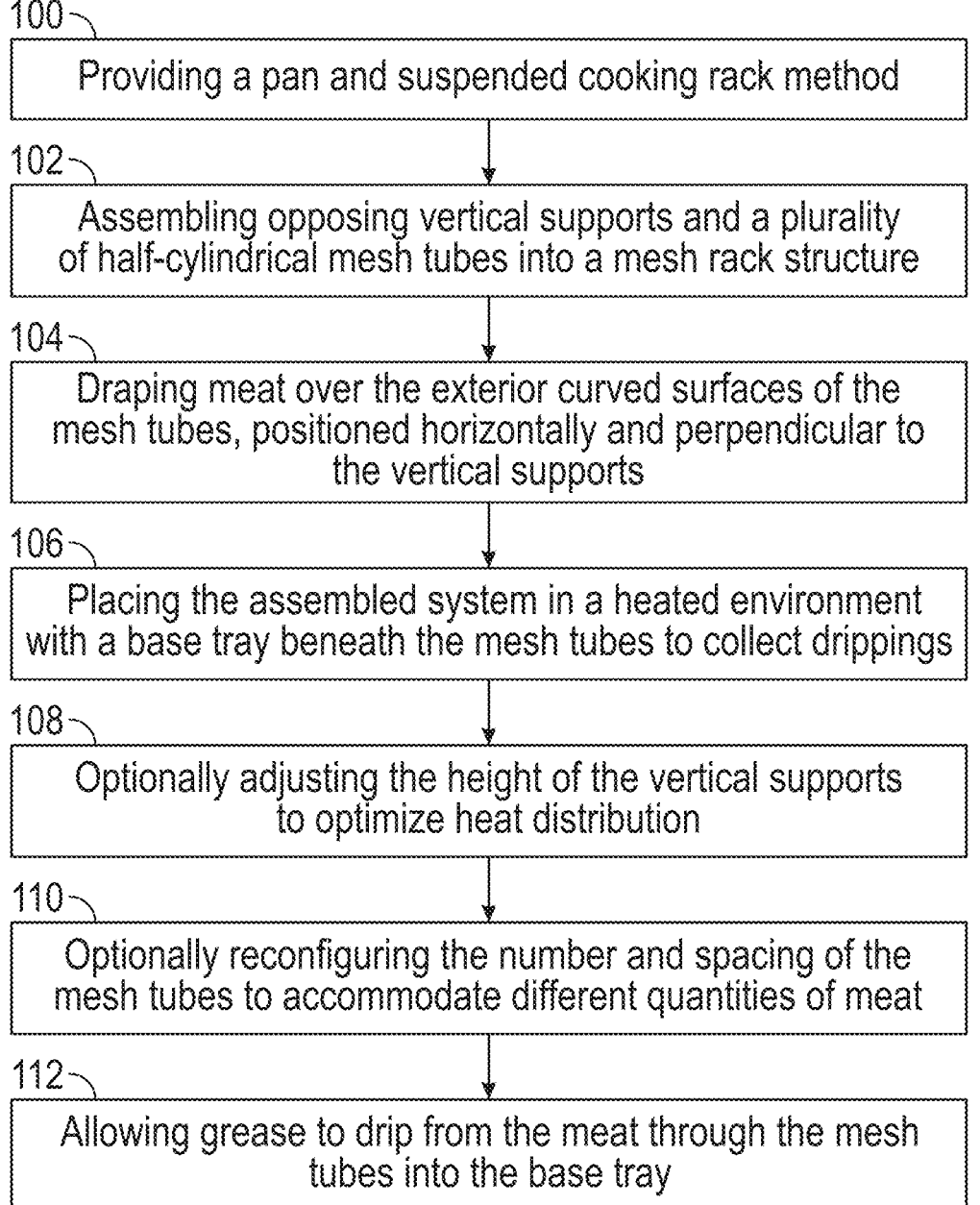

100 — Providing a pan and suspended cooking rack method

102 — Assembling opposing vertical supports and a plurality of half-cylindrical mesh tubes into a mesh rack structure 104 — Draping meat over the exterior curved surfaces of the mesh tubes, positioned horizontally and perpendicular to the vertical supports 106 — Placing the assembled system in a heated environment with a base tray beneath the mesh tubes to collect drippings 108 — Optionally adjusting the height of the vertical supports to optimize heat distribution 110 — Optionally reconfiguring the number and spacing of the mesh tubes to accommodate different quantities of meat 112 — Allowing grease to drip from the meat through the mesh tubes into the base tray

FIG. 6

PAN AND SUSPENDED COOKING RACK

FIELD OF THE INVENTION

The present disclosure relates to cooking appliances and systems. More particularly, but not exclusively, the present disclosure relates to a pan and suspended cooking rack system and method designed for baking, curing, and dehydrating meats, such as bacon, in a heated environment such as an oven with enhanced heat distribution and grease management.

BACKGROUND

Traditional oven baking and curing systems for meats, such as bacon, often utilize flat trays or racks that can lead to uneven cooking, grease accumulation, and difficulty in achieving consistent results. Some prior art systems, such as those disclosed in U.S. Pat. Nos. 9,730,553 and 8,627,764, incorporate racks with support members for grilling or cooking ribs, allowing for air circulation or grease drainage, but these designs typically feature multiple vertical supports holding meat in a vertical orientation parallel to the supports, often with additional horizontal pans or racks resting on the pan to support the meat. Other references, like U.S. Pat. Nos. 11,284,747 and 7,350,458, include trays with grease management and adjustable supports, yet they rely on conventional configurations that do not optimize for uniform cooking or curing of meats draped horizontally. These systems fail to address the need for a structure that ensures even heat exposure and efficient grease drainage without depending on a horizontal support surface beneath the meat. Therefore, there exists a need for an improved pan and suspended cooking rack system that overcomes these limitations by providing a novel arrangement for baking, curing, and dehydrating meats with enhanced performance.

SUMMARY

Therefore, it is a primary object, feature, or advantage of the present disclosure to improve over the state of the art by providing a pan and suspended cooking rack system that ensures uniform cooking, curing, and dehydrating of meats, such as bacon.

It is a further object, feature, or advantage of the present disclosure to provide a system with a suspended rack structure that allows grease to drip away from the meat, promoting crispiness and preventing accumulation.

It is a still further object, feature, or advantage of the present disclosure to offer a reconfigurable design with adjustable supports to accommodate varying quantities of meat.

Another object, feature, or advantage is to enable easy assembly and disassembly for convenient storage and use.

Yet another object, feature, or advantage is to provide a system that does not rely on a horizontal pan or rack for supporting the meat, distinguishing it from conventional designs.

An additional object, feature, or advantage is to adapt the system for use on BBQ grills or smokers by modifying the vertical supports with connectors suitable for grate attachment.

A further object, feature, or advantage is to enhance versatility by allowing the system to be compatible with a wide range of cooking pans through modular or detachable attachment mechanisms.

Another object, feature, or advantage is to incorporate an optional lid with ventilation control to optimize curing and dehydrating processes.

A still further object, feature, or advantage is to minimize cleaning effort and enhance ease of use by fabricating all components, including the base tray, vertical supports, and mesh tubes, from dishwasher-safe materials such as stainless steel, aluminum, or heat-resistant ceramics.

In at least one aspect of the disclosure, a pan and suspended cooking rack system is disclosed. The pan and suspended cooking rack system includes, for example, a base tray with raised edges for containing drippings, fabricated from a heat-resistant material, two vertical supports removably attached to the base tray at mounting points, and a mesh rack structure having a plurality of half-cylindrical mesh tubes positioned horizontally and perpendicular to the vertical supports, configured to support meat draped over their exterior curved surfaces for uniform cooking, curing, or dehydrating.

In at least one aspect of the disclosure, a method for using a pan and suspended cooking rack is disclosed. The method includes, for example, assembling two vertical supports and a plurality of half-cylindrical mesh tubes into a mesh rack structure, draping meat over the exterior curved surfaces of the mesh tubes, positioned horizontally and perpendicular to the vertical supports, and placing the assembled system in a heated environment, such as an oven, with a base tray beneath the mesh tubes to collect drippings.

In at least one aspect of the disclosure, a pan and suspended cooking rack is disclosed. The pan and suspended cooking rack includes, for example, a base tray with raised edges for containing drippings, two vertical supports removably attached to the base tray, and a plurality of half-cylindrical mesh tubes supported horizontally and perpendicular to the vertical supports, configured to support meat for cooking, curing, or dehydrating without reliance on a horizontal support surface.

In still another aspect of the disclosure, a suspended cooking rack system is disclosed. The system includes, for example, vertical supports configured for removable attachment atop of a pan, a rack structure positioned horizontally and perpendicular to the vertical supports, wherein the rack structure is configured to support meat for uniform cooking, curing, or dehydrating. The pan can include mounting points for securing opposing ends of vertical supports. Clips can removably attach opposing ends of the vertical supports to edges of the pan. Opposing ends of vertical supports can rotate relative to mounting points or clips to allow vertical supports to lay flat against pan. Alternatively, mounting points or clips, connected to vertical supports, can rotate whereby vertical supports lay flat in a horizontal orientation against the pan.

One or more of these and/or other objects, features, or advantages of the present disclosure will become apparent from the specification and claims that follow. No single aspect need provide each and every object, feature, or advantage. Different aspects may have different objects, features, or advantages. Therefore, the present disclosure is not to be limited to or by any objects, features, or advantages stated herein.

BRIEF DESCRIPTION OF THE DRAWINGS

Illustrated aspects of the disclosure are described in detail below with reference to the attached drawing figures, which are incorporated by reference herein.

FIG. 4A is a perspective view of one of the vertical supports for the racks.

FIG. 4B is a perspective view illustrating a partial section of a standard cookie pan and vertical support attached to the pan by a removable clip.

FIG. 5 is a perspective view of one of the racks.

FIG. 6 is a flow diagram illustrating a method for using the pan and suspended racks in accordance with an exemplary aspect of the present disclosure.

DETAILED DESCRIPTION

FIGS. 1-6 provide various pictorial illustrations for exemplary aspects of a pan and suspended cooking rack system and method in accordance with the objects, features, and advantages of the present disclosure. The disclosure is not to be limited to the particular aspects described herein. In particular, the disclosure contemplates numerous variations in the pan and suspended cooking rack system and method. The following description is presented for purposes of illustration and description. It is not intended to be an exhaustive list or limit any of the disclosure to the precise forms disclosed. It is contemplated that other alternatives or exemplary aspects are considered included in the disclosure. The description is merely examples of aspects, processes, or methods of the disclosure. It is understood that any other modifications, substitutions, and/or additions can be made, which are within the intended spirit and scope of the disclosure.

Figure 1:
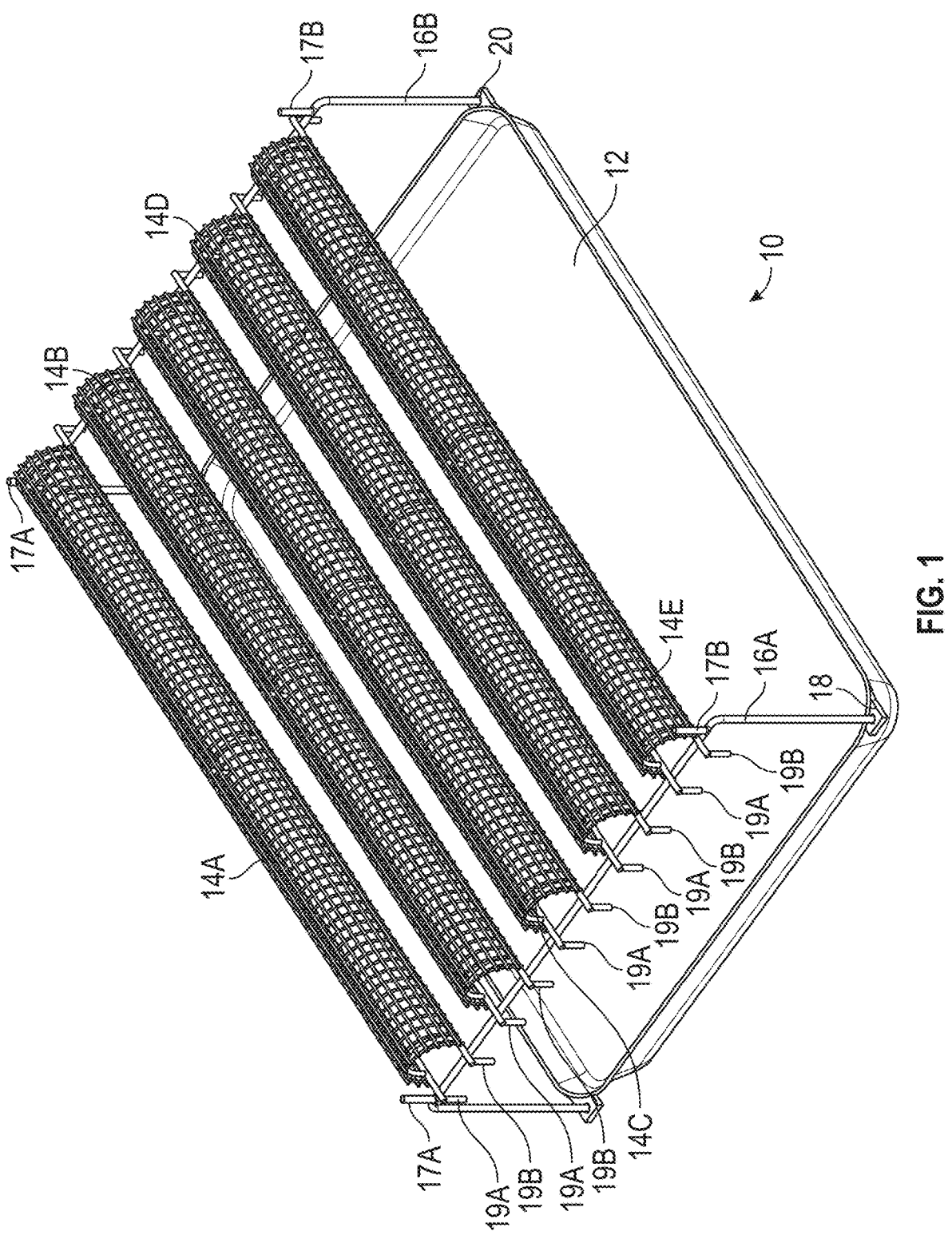
FIG. 1 illustrates a perspective view of a pan and suspended racks in accordance with an exemplary aspect of the present disclosure.

Referring to FIG. 1, a pan and suspended cooking rack system 10 is shown, comprising a base tray 12 with raised edges to contain grease and drippings, fabricated from durable, heat-resistant stainless steel. System 10 includes a mesh rack structure 14 supported above the base tray 12 by two vertical supports 16A and 16B, which are removably attached at mounting points 20 within flanges 18 positioned at the corners of the base tray 12. The mesh rack structure 14 consists of multiple half-cylindrical mesh tubes 14A-E, with their curved surfaces facing upward and arranged parallel to each other, fabricated from stainless steel mesh to allow air circulation and grease drainage. These half-cylindrical mesh tubes 14A-E are positioned horizontally and perpendicular to the vertical supports 16A and 16B, designed to hold strips of bacon or other meats draped over their exterior curved surfaces, ensuring even exposure to heat, such as from an oven, grill, smoker or other heat source, for uniform cooking, curing, or dehydrating. The vertical supports 16A and 16B are adjustable in height via gravity/friction fit or threaded connections, optimizing the distance between the mesh tubes 14A-E and the base tray 12 for heat distribution and grease collection. For example, vertical supports 16A and 16B may be removably connected to base tray 12 at varying positions to alter the height of mesh tubes 14A-E relative to base tray 12 or other supporting surface to which vertical supports 16A and 16B are attached, such as a grate in a grill grate, oven grate, or smoker grate. Opposing ends of vertical supports 16A and 16B can include a hinge whereby supports fold flat against base tray 12. The number and spacing of the half-cylindrical mesh tubes 14A-E can be reconfigured by adding or removing tubes to accommodate different quantities of meat, distinguishing the system from prior art that relies on multiple vertical supports and horizontal pans or racks. Additionally, all components of the system, including the base tray 12, vertical supports 16A and 16B, and mesh tubes 14A-E, can be fabricated from dishwasher-safe materials such as stainless steel, aluminum, or heat-resistant ceramics to minimize cleaning effort and enhance ease of use. Vertical supports 16A and 16B may include opposing retainer posts 17A and 17B to secure half-cylindrical mesh tubes 14A-E atop vertical supports 16A and 16B and limit side-to-side movement of half-cylindrical mesh tubes 14A-E to between opposing posts 17A and 17B. Similarly, half-cylindrical mesh tubes 14A-E may include retainer hooks 19A and 19B to secure half-cylindrical mesh tubes 14A-E atop vertical supports 16A and 16B and limit back-and-forth movement of half-cylindrical mesh tubes 14A-E between opposing vertical supports 16A and 16B.

Figure 2:
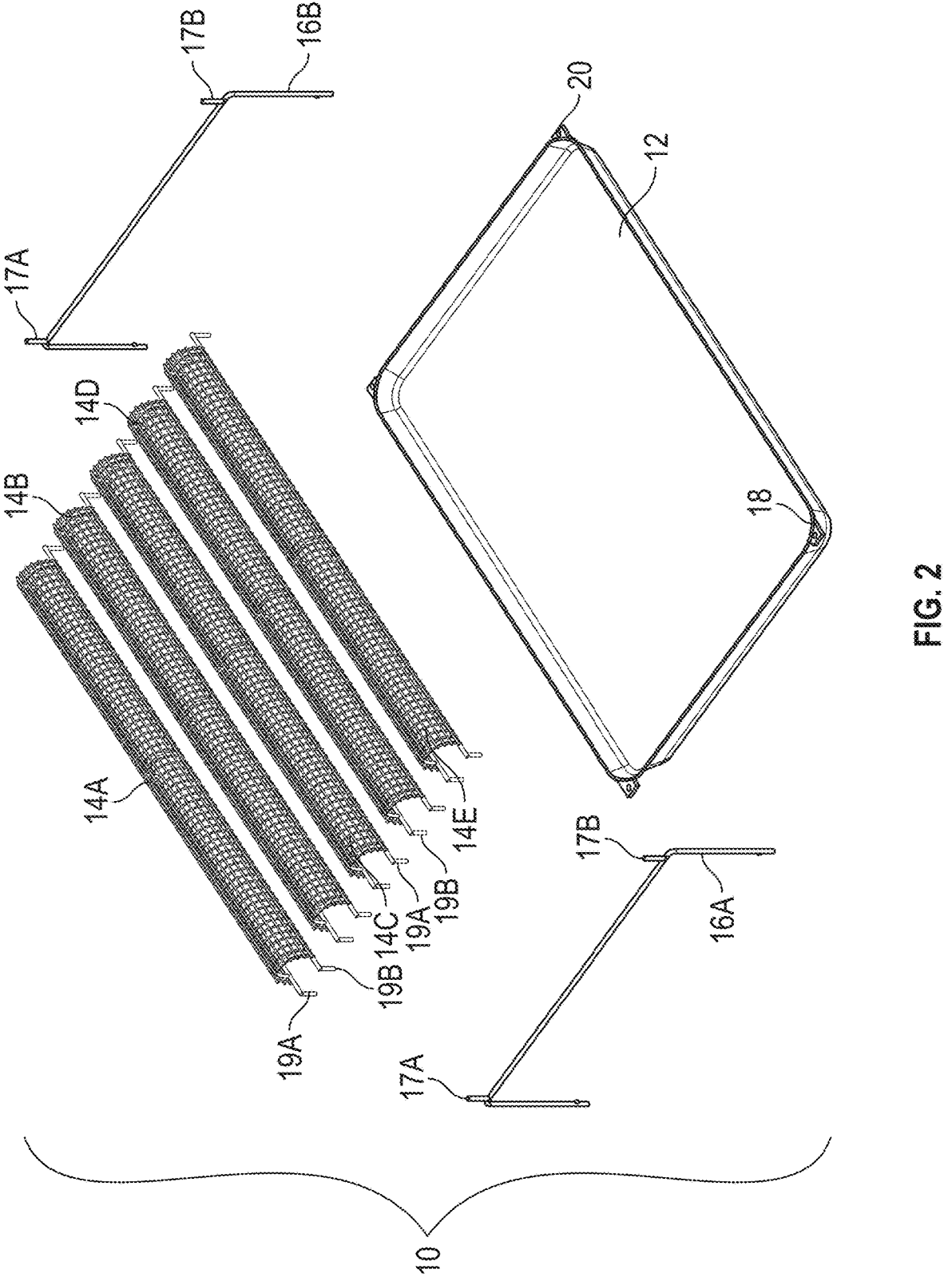
FIG. 2 is an exploded view of FIG. 1.
Figure 3:
FIG. 3 is a perspective view of the pan.

FIG. 2 provides an exploded view of system 10, illustrating the assembly of the base tray 12, vertical supports 16A and 16B, and mesh rack structure 14A-E. FIG. 3 shows the base tray 12 in isolation, highlighting its raised edges having flanges 18 with mounting points 20. FIG. 4A depicts a vertical support 16, showing its adjustable height mechanism, FIG. 4B depicts a partial section of a standard cookie pan 12 and a partial section of vertical support 16 removably attached to clip 21 by inserting an end of vertical support 16 through hole 22 in clip 21 and removably attaching clip 21 to the edge of pan 12, while FIG. 5 illustrates a half-cylindrical mesh tube 14, emphasizing its curved design for meat support. FIG. 6 outlines a method for using the system, including steps such as assembling the vertical supports and mesh tubes, placing meat on the tubes, positioning the system in an oven, and collecting drippings in the base tray.

In alternative embodiments, system 10 offers extensive variations to those illustrated. The base tray 12, initially rectangular, may be circular, square, oval, or polygonal, with adjustable or fixed raised edges of varying heights (e.g., 0.5 to 2 inches) to accommodate different volumes of drippings. Materials for the base tray 12 can include stainless steel, aluminum, heat-resistant ceramic, or non-stick coated metals, with surface treatments like enamel or anodizing to enhance durability and heat resistance. The base tray 12 may be fabricated from materials suitable for varying heated or heatable environments, such as a microwave, convection or regular oven, smoker, grill or other cooking, curing or smoking environment. The flange 18 and mounting points 20 are configured and supported on the outside of base tray 12 and not within the base tray 12 where grease is collected resulting in a base tray that is easier to clean and stack in a traditional manner with other base trays in a stacking arrangement. In one aspect, flange 18 can be configured with a mechanical or living hinge to allow rotation of mounting points 20 between vertical and horizontal orientations whereby vertical supports 16A and 16B, when connected to mounting points 20, can rotate between vertical and horizontal orientations for use and storage. Thus, system 10 does not rely on the bottom interior portion of base tray 12 for support of rack structures 14A-E or the meat being suspended from rack structures 14A-E for cooking, smoking, curing, dehydrating or otherwise preparing meat for consumption. The base tray 12 can be modified to support or attach to the vertical supports 16A and 16B in several ways:

Hinged Connections: Vertical supports 16A and 16B may feature hinged joints at the base, allowing them to fold over into the base tray 12 for compact storage. Hinges can be mechanical (e.g., pivot pins) or living hinges integrated into the material, with locking mechanisms (e.g., latches or clips) to secure the supports in an upright position during use.

Snap-On Connections: The vertical supports 16A and 16B can include snap-on fittings (e.g., spring-loaded clips or detents) that attach to corresponding slots or rims on the base tray 12 or any standard cooking pan, sheet, or baking pan, enabling universal compatibility. These fittings may include adjustable clamps or elastic bands to secure the supports to pans of varying thicknesses or shapes. For example, as illustrated in FIG. 4B, a pan, such as a standard cookie pan 12, can be used with system 10 by using a removable clip 21 that removably secures vertical supports 16A and 16B to the edge of pan 12. In at least one configuration, clip 21 can be positioned on opposing sides of pan 12 and lower ends of vertical supports 16A and 16B removably inserted into a hole 22 in each clip 21 to secure vertical supports 16A and 16B above pan 12. Opposing ends of vertical supports 16A and 16B can be removed from holes 22 and opposing clips 21 removed from pan 12 to disassemble system 10. Clip 21, vertical supports 16A and 16B, and pan 12 can be washed separately and reassembled for use. In this manner, system 10 can be used with a standard cookie pan 12 without having to make modifications to pan 12 for use with system 10. Detaching clip 21 with vertical supports 16A and 16B allows them to be stored flat with the pan 12.

Click-On Supports: The vertical supports 16A and 16B can be modified with click-on fittings, such as spring-loaded clips or pegs, designed to securely attach to the side edges of a standard cookie sheet without requiring mounting points 20 in the pan corners, allowing use of existing cookie sheets and enhancing compatibility, such as by use of clip 21 shown in FIG. 4B and discussed above.

Threaded Attachments: The mounting points 20 within flanges 18 can be threaded sockets, allowing the vertical supports 16A and 16B to screw into the base tray 12 or an adapter plate, providing a secure, adjustable connection that can be adapted to different pan designs.

Magnetic Attachments: The base tray 12 can incorporate magnetic strips or plates at mounting points 20, with the vertical supports 16A and 16B featuring corresponding magnetic or ferromagnetic ends, allowing quick attachment and detachment to ferromagnetic pans or an optional magnetic adapter for non-magnetic surfaces.

Friction-Fit Slots: The base tray 12 can have slotted channels or grooves along its edges or corners, into which the vertical supports 16A and 16B slide and lock via friction, with optional locking pins or screws for added stability, adaptable to various pan dimensions.

Clamp-On Mechanisms: The vertical supports 16A and 16B can be equipped with adjustable clamps or brackets that grip the edges of the base tray 12 or any compatible pan, with rubberized or heat-resistant pads to prevent slipping and accommodate irregular pan shapes such as by use of clip 21 shown in FIG. 4B and discussed above.

Modular Base Adapters: The base tray 12 can include a modular adapter frame with universal mounting points (e.g., a grid or perforated base) that accepts the vertical supports 16A and 16B, allowing the system to be used with any flat or shallow pan by placing the adapter on top.

The mesh rack structure 14 can vary beyond half-cylindrical tubes 14A-E, including full cylindrical tubes, flat mesh panels, V-shaped or U-shaped panels, or perforated sheets, fabricated from stainless steel, copper mesh, non-stick coated steel, perforated heat-resistant silicone, or titanium for enhanced heat conductivity or flexibility. The mesh tubes 14A-E can be fixed or rotatable. The vertical supports 16A and 16B can be telescoping, foldable with hinges, or fixed-length with detachable sections, using materials like stainless steel, aluminum, or reinforced composites, including materials suitable for use in various heated environments such as an oven, smoker, BBQ grill, microwave, and convention oven. Connections between the supports and mesh tubes can include friction fits, threaded joints, snap-fits, or magnetic couplings, with additional stabilizing crossbars or braces for larger configurations. An attachable lid with adjustable ventilation holes, made of heat-resistant glass or metal, can enhance curing or dehydrating by controlling airflow, with optional temperature sensors or vents. Alternatively, the mesh tubes 14A-E can be fabricated as solid metal half-cylinders, offering a cost-effective and easier-to-clean option while maintaining structural integrity for meat support.

Additionally, the vertical supports 16A and 16B, along with the mesh rack structure 14, can be adapted for use on a BBQ grill, microwave, or smoker. The attachment ends of the vertical supports can be modified with connectors suitable for connecting to a BBQ or smoker grate, such as hook-shaped ends, clamp-on brackets, or threaded adapters that secure to grate bars. These connectors can be adjustable or interchangeable, allowing the supports to attach to grates of varying thicknesses or configurations, enabling the system to function outdoors with direct heat sources while maintaining the horizontal meat support and grease drainage benefits.

What is claimed is:

1. A suspended cooking rack system, comprising:
vertical supports with opposing legs spaced apart by a horizontal portion configured for removably supporting a plurality of rack structures, the vertical supports having lower ends configured for removable attachment atop of a pan wherein the horizontal portion of each vertical support is disposed atop of the pan;
each of the plurality of rack structures comprising opposing retainer hooks and a half cylindrical member disposed atop of and spaced between the opposing retainer hooks, wherein the half cylindrical member is configured to support meat for uniform cooking, curing, or dehydrating; wherein each of the plurality of rack structures is removably repositionable atop of the horizontal portion of the vertical supports to increase or decrease a number of the plurality of rack structures used to allow meat to hang over and down opposing sides of the half cylindrical member; and
vertical support clips having a vertical support attachment point and a pan attachment point, the vertical support clips configured for removable attachment to edges of the pan for removably attaching the lower ends of the vertical supports to the pan.

2. The suspended cooking rack system of claim 1, wherein the vertical supports include opposing retainer posts extending upwardly from the horizontal portion of the vertical supports for securing the rack structure atop of the horizontal portion of the vertical supports.

3. The suspended cooking rack system of claim 1, wherein the opposing retainer hooks include terminal ends having downwardly extending members for individually securing each of the plurality of rack structures atop of the horizontal portion of the vertical supports.

4. The suspended cooking rack system of claim 1, wherein the half cylindrical member comprises half-cylindrical mesh tubes.

5. The suspended cooking rack system of claim 1, wherein the plurality of rack structures are parallelly disposed relative to each other atop of the horizontal portion and perpendicularly disposed relative to the vertical supports.

6. The suspended cooking rack system of claim 1, wherein opposing ends of the plurality of rack structures are supported atop the pan by the horizontal portion of opposing vertical supports.

7. The suspended cooking rack system of claim 1, wherein the vertical supports have a height configured to position the meat supported by the plurality of rack structures suspended above and resting atop of the horizontal portions of opposing vertical supports and in non-touching engagement with the underlying pan.

\* \* \* \* \*